(12) United States Patent
Uddin

(10) Patent No.: US 7,837,594 B2
(45) Date of Patent: Nov. 23, 2010

(54) METHOD FOR ACCELERATING A VEHICLE FROM A STOP OR FOR STOPPING A VEHICLE ON A GRADIENT

(75) Inventor: Shafiq Uddin, Warwickshire (GB)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/463,890

(22) Filed: May 11, 2009

(65) Prior Publication Data

US 2009/0258754 A1 Oct. 15, 2009

Related U.S. Application Data

(63) Continuation of application No. PCT/DE2007/001978, filed on Nov. 2, 2007.

(30) Foreign Application Priority Data

Nov. 13, 2006 (DE) .................. 10 2006 053 319

(51) Int. Cl.
 *B60W 10/06* (2006.01)
 *B60W 10/18* (2006.01)
(52) U.S. Cl. ...................................... 477/185; 477/901

(58) Field of Classification Search ................. 477/188, 477/199, 211, 901
See application file for complete search history.

(56) References Cited

U.S. PATENT DOCUMENTS 3,912,056 A * 10/1975 Neal ........................... 477/188
2005/0057090 A1 3/2005 Kinser et al.

FOREIGN PATENT DOCUMENTS

DE 103 11 445 A1 9/2004
GB 2 325 059 A 11/1998

* cited by examiner

Primary Examiner—Sherry L Estremsky
Assistant Examiner—Edwin A. Young
(74) Attorney, Agent, or Firm—Simpson & Simpson, PLLC

(57) ABSTRACT

A method for starting or stopping a vehicle on a gradient. In order to protect the clutch (12) against overheating and therefore against excessive wear during the actuation of at least one brake (48) and simultaneous pressing of the accelerator pedal (44), a torque reduction in the form of a torque reduction request is transmitted to the engine control unit (40) taking into account the position of an accelerator pedal, and a reduced torque is transmitted to the clutch on the basis of said torque reduction request.

6 Claims, 2 Drawing Sheets

METHOD FOR ACCELERATING A VEHICLE FROM A STOP OR FOR STOPPING A VEHICLE ON A GRADIENT

CROSS-REFERENCE TO RELATED APPLICATIONS

This application is filed under 35 U.S.C. §120 and §365(c) as a continuation of International Patent Application PCT/DE2007/001978, filed on Nov. 2, 2007, which application claims priority from German Patent Application No. 10 2006 053 319.4, filed Nov. 13, 2006, which applications are incorporated herein by reference in their entirety.

The invention relates to a method for accelerating a vehicle from a stop or for stopping a vehicle on a gradient.

In an automatic transmission which is connected to at least one friction clutch said clutch is subjected to an increased load in particular when accelerating from a stop on a gradient. It is known that either the pedal brake has to be actuated by the driver or the parking brake has to be manually actuated in order to prevent a roll back when accelerating on a gradient from a stop. Thus, the process of accelerating from a stop becomes the more difficult, the steeper the gradient. When the driver of such a vehicle delays an acceleration process from a stop with a partially closed clutch or intentionally holds the vehicle for a long period of time on the gradient with the clutch slipping, the thermal loading of the friction clutch increases. On the other hand it can also be inferred that the driver uses either the hand brake or the pedal brake when the gradient is very steep in order to prevent the roll back of the vehicle. Thus, the driver simultaneously actuates the accelerator pedal. This way, a torque is generated in the clutch which can be very high.

However in order to accelerate from a stop, the brakes have to be released so that the force transfer torque can be transmitted from the clutch to the wheels.

Before the vehicle starts moving, it is being held in the brakes with the accelerator pedal depressed. The moment generated by the engine is transferred to the clutch. However, this moment is not required for accelerating the vehicle, but it initially acts against the brake which is still actuated. Thus, the energy is inducted into the clutch, however, without being used for accelerating the vehicle. Furthermore this excessively high energy inducted into the clutch leads to an excessive temperature increase, which leads to excessive clutch wear.

Thus, it is the object of the invention to provide a method for accelerating a vehicle form a stop on a gradient, wherein the clutch is protected against overheating and thus protected against excessive wear when at least one brake is actuated and the accelerator pedal is pressed simultaneously.

Thus, a moment from a drive engine which is connected to an engine control unit for electronic moment control is connected to an automatic clutch which is connected with said engine. The downhill gradient force impacting the vehicle is counteracted by using the pedal and/or the parking brake. When accelerating from a stop, the position of the accelerator pedal is selected through a lowered torque diagram which is stored in the engine control unit and said torque is transferred to the clutch, wherein said torque is only insignificantly greater than the brake force.

In another advantageous embodiment of the invention the target moment request to the control unit is only initiated when at least one brake is actuated.

In another advantageous embodiment of the invention the moment reduction is implemented through an electronic ramp after the reduction of the brake force by releasing the at least one brake.

Further advantages and advantageous improvements are recited in the subsequent description in particular with reference with to the following drawing figures, wherein.

Figure 1:
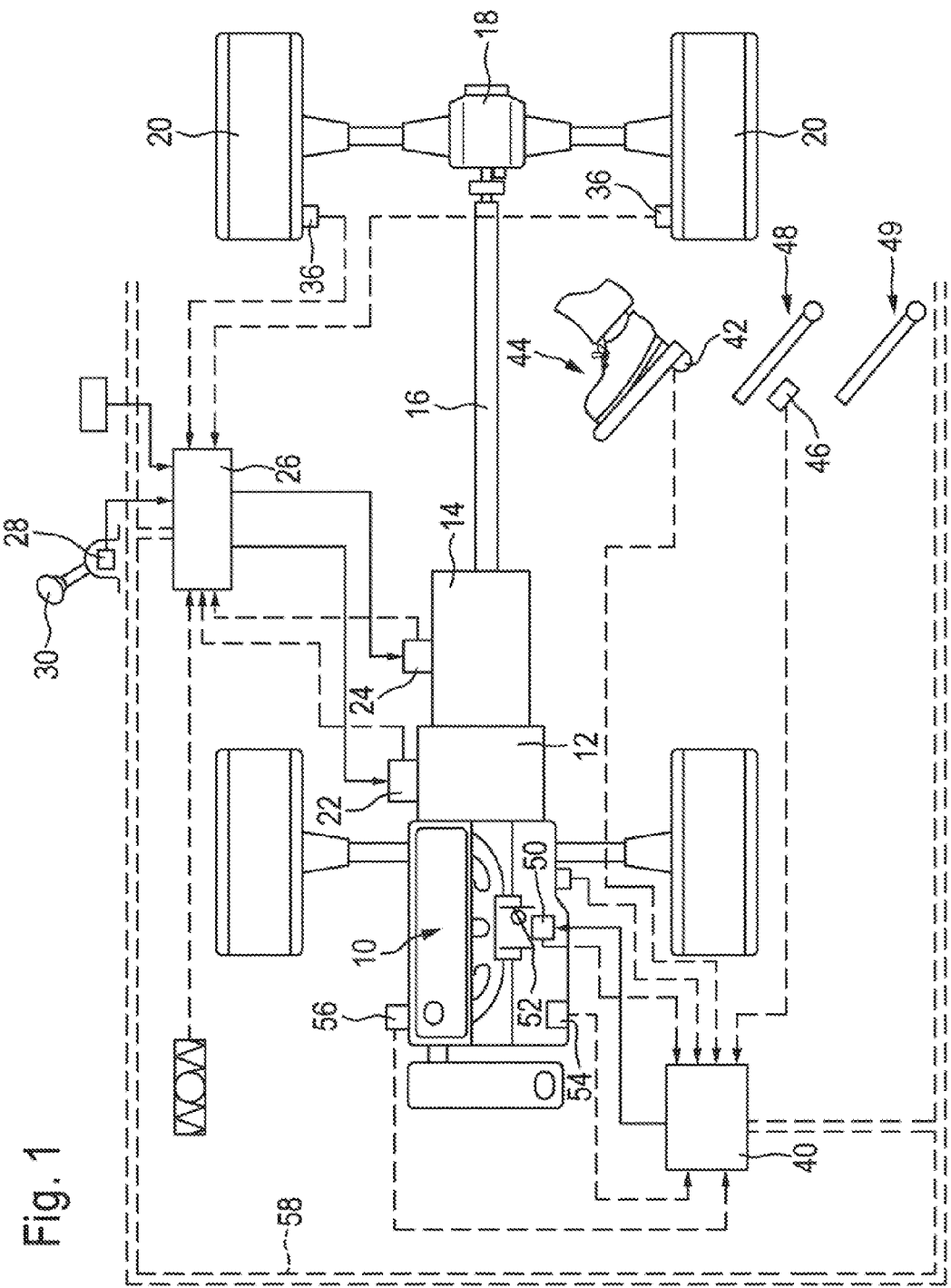
FIG. 1 shows a schematic illustration of a drive train of a motor vehicle.

FIG. 1 shows the drive train of a motor vehicle in a schematic illustration. In said drive train a drive engine 10 is connected to a clutch 12 and to a transmission 14, wherein the output shaft of the transmission 14 drives the rear wheels 20 of the motor vehicle through a cardan shaft 16 and through a differential 18.

In this embodiment a clutch 12 is illustrated as a conventional friction clutch, whose actuation lever is operated by a clutch actuator, e.g. an electric motor.

The transmission 14 can be e.g. an automated straight shift transmission, whose shifting member can be actuated by a transmission actuator 24 for selecting and shifting a gear. For this purpose the actuator 24 includes two electric motors.

A transmission control unit 26 is used for controlling the clutch actuator 22 and the transmission actuator 24, wherein the transmission control unit 26 comprises inputs connected with sensors for detecting the position of the clutch actuator 22, wherein the transmission actuator 24 of said transmission control unit is connected to a sensor 28 for detecting the position of a transmission selector lever 30, to wheel speed sensors, like e.g. the illustrated sensors 36 for the rear wheels and possibly to additional sensors. The transmission control unit 26 includes a microprocessor in which programs are stored, according to which the actuators 22 and 24 are controlled as a function of the input signals.

An engine control unit 40 is provided for controlling the drive engine 10, wherein the inputs of said engine control unit are connected with a sensor 42 for detecting the position of an accelerator pedal 44, with a sensor 46 for detecting the position of a brake pedal 48, with a sensor for detecting the speed of the crankshaft of the internal combustion engine, with a sensor for detecting the position of an actuator 50 for adjusting a power control member 52 of the internal combustion engine, with a sensor 54 for detecting the air flow flowing to the internal combustion engine, with a sensor 56 for detecting the temperature of the combustion engine, and possibly with additional sensors. An output of the engine control unit 40 controls the actuator 50 for controlling the power control member (the throttle butterfly) of the internal combustion engine. Parking brake (49) also is provided.

The control units 26 and 40 are connected with one another through a main bus conductor 58, so that data can be transmitted between the control units 26 and 40.

For closing the clutch 12 for accelerated from a stop or for a gear change, the clutch 12 is actuated according to a characteristic diagram stored e.g. in the transmission control unit 26, which diagram defines the respectively transferrable clutch moment as a function of the position of the actuation member of the clutch or of the clutch actuator 22.

During a normal acceleration method from a stop in which the first gear is shifted and the accelerator pedal is actuated, the clutch actuator 22 is controlled e.g. so that the clutch 12 transfers a predetermined torque which increases as a function of the position of the accelerator pedal 24 up to a maximum value, wherein the drive engine 10 is controlled, so that it runs at a predetermined target speed for accelerating form a stop as a function of the position of the accelerator pedal 44, which target speed for accelerating from a stop corresponds to a speed for accelerating form a stop which leads to a respective target velocity for accelerating from a stop with the clutch 12 not slipping.

Figure 2:
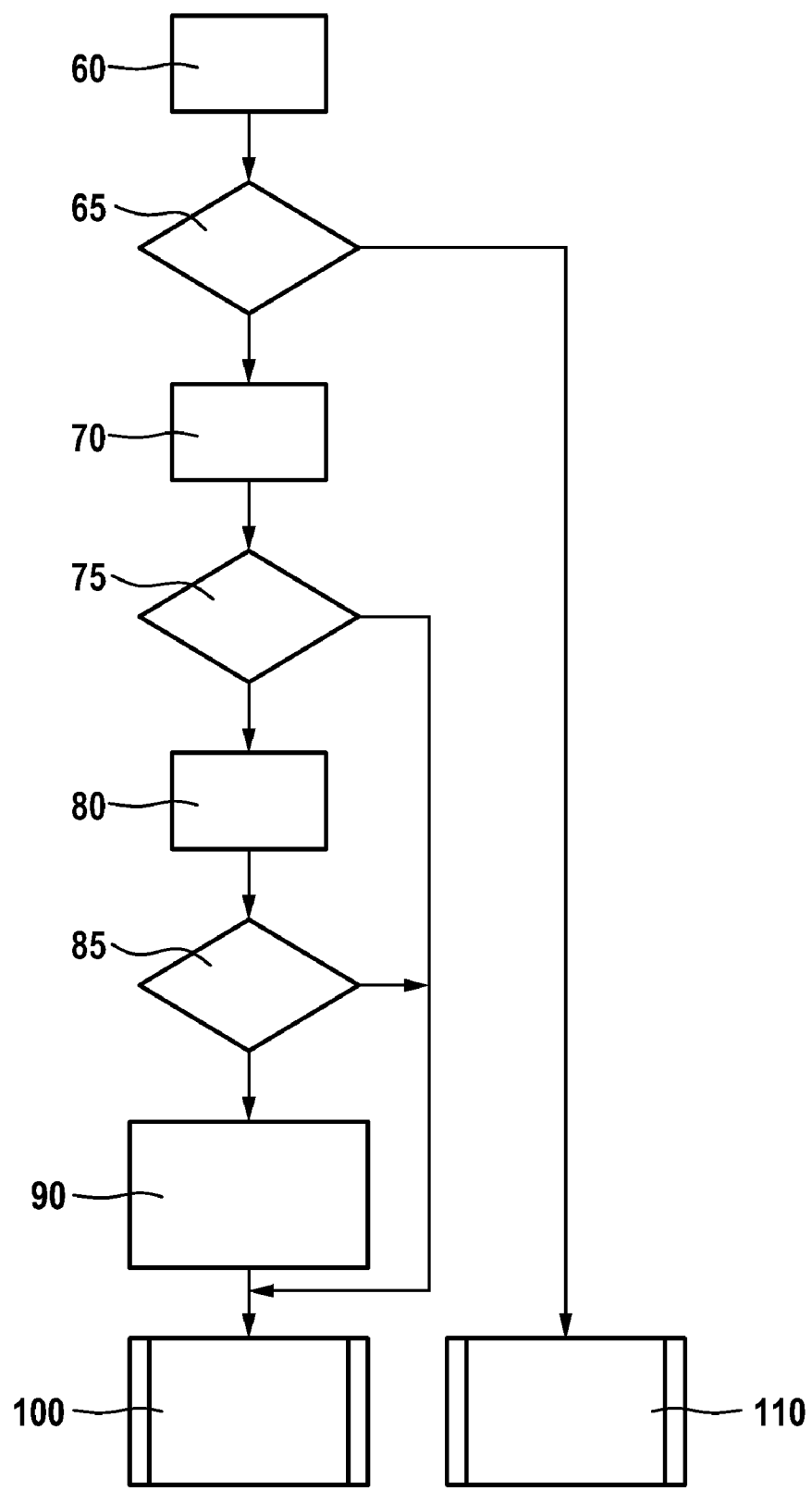
FIG. 2 shows the execution of the method with reference to the flow chart.

FIG. 2 shows the method according to the invention with reference to a flow chart. Starting with a situation where a driver initiates an acceleration method from a stop by actuating the accelerator pedal and thus e.g. stands on the pedal brake. Thus, in method step 60 the present engine speed determined by the sensor and the angular position of the pedal is detected by the sensor 42 and transmitted to the control unit

40. At the input of the control unit 40 the request to reduce torque is initialized with a value which is greater than the maximum engine torque. This protects against an erratic torque change caused by an initial setting which is too low. In method step 60 a torque increase request is computed from the current input values. Subsequently it is determined in step 65, if the torque increase request is activated. If this is confirmed by the control unit 40, said torque increase request is transmitted to the control unit 40 in step 110. However, when the activation of the torque increase request is denied in step 65, a torque reduction request is computed in step 70. Subsequently an interrogation is performed in step 75, if a brake is actuated or not. When this interrogation yields that at least one brake is depressed, a limit value for the brake holding moment is computed. When the desired limit for the torque reduction is reached, said target torque is maintained until the driver releases the brake pedal.

As soon as the brake pedal is released the torque reduction request is implemented in the engine control unit by using a ramp.

In method step 80, the request follows if the brake holding moment is less than the torque reduction request, or not. If the torque reduction request is smaller, step 90 yields that the torque reduction request is equal to the brake holding moment. This result that a torque reduction is required is transmitted to the control unit 40 in step 100 in order to lower the maximum engine torque to said requirement, thus reducing it. Thus, the energy input into the clutch 12 is limited. The torque reduction is thus performed in a controlled manner in steps down to the limit value predetermined in step 80 in order to prevent a sudden reduction which would lead to jolts felt by the driver.

As soon as the torque reduction request has decreased to a value which is greater than the value which can be achieved by the engine, the method starts again with step 65.

However, when the interrogations in step 75 yield that neither a brake is actuated nor the current brake holding torque in step 85 is smaller than the request for torque reduction, this information is transmitted to the control unit 40 in step 100.

By using said method according to the invention it was determined that the energy savings is proportional to the duration of the actuation of the brake and the accelerator pedal by the driver. Contrary to accelerating from a stop at the gradient it is possible much longer for a driver to actuate the brake on even ground in order to keep the vehicle at a certain spot. In order to save energy said method used on flat surfaces is even more important.

By installing additional logics (not shown) it would be possible to change the torque reduction request with an existing brake pressure signal also with said signal. A logical theoretical approach would be to obtain a lower reduction limit when the brake pressure is high since the vehicle is held in the brakes. Since the brake pressure is reduced then, the reduction limit would be increased in order to further reduce the reduction.

REFERENCE NUMERALS AND DESIGNATIONS 10 drive engine/drive motor
12 clutch
14 transmission
16 cardan shaft
18 differential
20 rear wheel
24 clutch actuator
26 transmission control unit
28 sensor
30 selector lever
36 wheel speed sensor
40 engine control unit
42 sensor
44 accelerator pedal
46 sensor
48 brake pedal
50 actuator
52 power control member
54 sensor
56 sensor
58 main bus conductor
60-110 method steps

The invention claimed is:

1. A method for accelerating a vehicle from a stop on a gradient, comprising:
   transmitting a moment from a drive engine (10), which is connected to an engine control unit (40) for electronic moment control, to an automated clutch connected to said drive engine, wherein a downward gradient force impacting the vehicle is counteracted by using at least one pedal or parking brake;
   measuring a position of an accelerator pedal using a sensor;
   transmitting a moment reduction in the form of a moment reduction request to the engine control unit (40) as a function of the position of the accelerator pedal; and,
   transmitting a reduced moment to the clutch (12).

2. The method according to claim 1, further comprising generating a brake force by actuating at least one brake as a precondition for the request to the engine control unit (40) to reduce the moment.

3. The method according to claim 2, further comprising implementing the moment reduction through an electronic ramp after the brake force has been reduced by disengaging the brake.

4. A method for accelerating a vehicle from a stop on a gradient, comprising:
   transmitting a moment from a drive engine (10), which is connected to an engine control unit (40) for electronic moment control, to an automated clutch connected to said drive engine, wherein the downward gradient force impacting the vehicle is counteracted by using at least one pedal and parking brake;
   measuring a position of an accelerator pedal using a sensor;
   transmitting a moment reduction in the form of a moment reduction request to the engine control unit (40) as a function of the position of the accelerator pedal; and,
   transmitting a reduced moment to the clutch (12).

5. The method according to claim 4, further comprising generating a brake force by actuating at least one brake as a precondition for the request to the engine control unit (40) to reduce the moment.

6. The method according to claim 5, further comprising implementing the moment reduction through an electronic ramp after the brake force has been reduced by disengaging the brake.

* * * * *